US007990911B2

(12) United States Patent
Sutivong et al.

(10) Patent No.: US 7,990,911 B2
(45) Date of Patent: Aug. 2, 2011

(54) EFFICIENT ACK TO NACK ERROR DETECTION

(75) Inventors: Arak Sutivong, Bangkok (TH); Avneesh Agrawal, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1432 days.

(21) Appl. No.: 11/317,868

(22) Filed: Dec. 22, 2005

(65) Prior Publication Data
US 2007/0147253 A1 Jun. 28, 2007

Related U.S. Application Data

(60) Provisional application No. 60/638,542, filed on Dec. 22, 2004.

(51) Int. Cl.
*H04W 4/00* (2009.01)
(52) U.S. Cl. ........................................ 370/328
(58) Field of Classification Search .................. None
See application file for complete search history.

(56) References Cited

U.S. PATENT DOCUMENTS

| 5,664,091 | A | | 9/1997 | Keen |
| 5,825,807 | A | * | 10/1998 | Kumar ........................... 375/130 |
| 5,881,069 | A | | 3/1999 | Cannon et al. |
| 6,011,796 | A | | 1/2000 | Rezaiifar et al. |
| 6,215,982 | B1 | * | 4/2001 | Trompower .................. 455/63.3 |
| 6,246,698 | B1 | * | 6/2001 | Kumar ........................... 370/487 |
| 6,378,099 | B1 | | 4/2002 | Rowitch |
| 6,378,432 | B1 | | 4/2002 | Lewis |
| 6,463,097 | B1 | * | 10/2002 | Held et al. ..................... 375/225 |
| 7,263,119 | B1 | * | 8/2007 | Hsu et al. ....................... 375/150 |

FOREIGN PATENT DOCUMENTS

| EP | 0866579 A1 | 9/1998 |
| RU | 2235432 | 8/2004 |
| WO | WO9917488 | 4/1999 |

OTHER PUBLICATIONS

International Search Report—PCT/US05/046985, International Searching Authority—European Patent Office, Jun. 22, 2005.
Written Opinion—PCT/US05/046985, International Searching Authority—European Patent Office, Jun. 22, 2006.
International Preliminary Report on Patentability—PCT/US05/046985, The International Bureau of WIPO—Geneva, Switzerland, Jun. 27, 2007.

* cited by examiner

*Primary Examiner* — Raj K Jain
(74) *Attorney, Agent, or Firm* — Mary A. Fales

(57) ABSTRACT

A method and apparatus to determine whether a transmission was successfully received in a multiple access communication system is claimed. First and second encoded data packets are received and decoded. The first and second data packets are then re-encoded, and correlated to determine whether the first and second re-encoded data packets are the same. If there is a high degree of correlation, an indicator of acknowledgement is transmitted to indicate that there is a high degree of correlation between the first and second re-encoded data packets. If there is a low degree of correlation, a determination is made that the previously transmitted indicator of acknowledgement was correctly received.

16 Claims, 7 Drawing Sheets

EFFICIENT ACK TO NACK ERROR DETECTION

CLAIM OF PRIORITY UNDER 35 U.S.C. §119

The present Application for Patent claims priority to Provisional Application No. 60/638,542 entitled "EFFICIENT ACK TO NACK ERROR DETENTION" filed Dec. 22, 2004, and assigned to the assignee hereof and hereby expressly incorporated by reference herein.

BACKGROUND

I. Field

The invention relates generally to the field of wireless communications, and more particularly to a method, apparatus, and system for efficiently determining ACK to NACK errors in multiple access communication systems.

II. Background

In recent years, communication systems' performance and capabilities have continued to improve rapidly in light of several technological advances and improvements with respect to telecommunication network architecture, signal processing, and protocols. In the area of wireless communications, various multiple access standards and protocols have been developed to increase system capacity and accommodate fast-growing user demand. These various multiple access schemes and standards include Time Division Multiple Access (TDMA), Frequency Division Multiple Access (FDMA), Code Division Multiple Access (CDMA), and Orthogonal Frequency Division Multiple Access (OFDMA), etc. Generally, in a system which employs TDMA technique, each user is allowed to transmit information in his assigned or allocated time slots whereas an FDMA system allows each user to transmit information on a particular frequency that is assigned to that particular user. A CDMA system, in contrast, is a spread spectrum system which allows different users to transmit information at the same frequency and at the same time by assigning a unique code to each user. In an OFDMA system, a high-rate data stream is split or divided into a number of lower rate data streams which are transmitted simultaneously in parallel over a number of subcarriers (also called subcarrier frequencies herein). Each user in an OFDMA system is provided with a subset of the available subcarriers for transmission of information. The subset of carriers provided to each user in an OFDMA system can be fixed or vary, for example, in the case of Frequency-Hopping OFMDA (FH-OFDMA). Multiple access techniques in TDMA, FDMA, and CDMA are illustrated in FIG. 1. As shown in FIG. 1, the communication channels in FDMA are separated by frequencies in which a particular channel corresponds to a particular frequency. In a TDMA system, the communication channels are separated by time in which a particular channel corresponds to a particular time slot. In contrast, communication channels in a CDMA system are separated by codes in which a particular channel corresponds to a particular code.

In wireless systems, it is usually inefficient to guarantee a reliable packet transfer on every single transmission. The inefficiency is particularly pronounced in systems where underlying channel conditions vary drastically from transmission to transmission. For example, in an FH-OFDMA system, there is a wide variation in the received signal-to-noise ratio (SNR) between frames/packets, thus making it difficult and inefficient to guarantee a small frame error rate (FER) for each packet transmission. Such difficulty and inefficiency also apply to other communication systems which employ orthogonal multiple access techniques including, but are not limited to, TDMA, FDMA, and orthogonal CDMA, etc.

In such communication systems, a packet retransmission mechanism such as the Automatic Retransmission/Repeat Request (ARQ) scheme may be used to help increase efficiencies in message transmissions and to improve packet transmission reliability. A packet transmission acknowledgment is signaled from the receiver to the transmitter using a low-rate feedback channel. Upon successful receipt of such transmissions, the access point typically sends an indicator of acknowledgment (i.e., an ACK message) to the access terminal that the previous transmission is received correctly and that the receiver is ready for a new packet transmission. A negative acknowledgment (NACK), on the other hand, suggests that an error is detected in the previously transmitted packet and that a retransmission is required.

Generally, there are two categories of packet combining techniques: code combing and diversity combining. In code combining systems, sub-packets are concatenated to form noise-corrupted codewords from increasingly longer and lower-rate codes. An example of a code combing technique is the Type-II Hybrid ARQ (H-ARQ) protocol, where the transmitter responds to the retransmission requests by sending additional parity bits to the receiver. The receiver appends these bits to the received packet, allowing for increased error correction capability. In diversity combining systems, the individual symbols from multiple, identical copies of a packet are combined to create a single packet with more reliable constituent symbols In systems where ARQ is used, the transmitter and the receiver need to remain synchronized in terms of the order in which packets are transmitted. If the feedback channel is error-free, the packet (or sub-packets, in case of retransmission) ordering is implicit. However, such an error-free transmission on the feedback channel cannot be achieved in practice. An error in the acknowledgment can cause packet (or sub-packet) sequencing error at the physical layer.

There are two types of error on the acknowledgment channel: (i) ACK→NACK and (ii) NACK→ACK. A positive acknowledgment mistaken as a negative acknowledgment (ACK→NACK) causes a small loss in throughput, while a negative acknowledgment mistaken as a positive acknowledgment (NACK→ACK) causes a retransmission at a higher layer (e.g., RLP). Both errors, if not detected, can cause the transmitter and the receiver to lose packet-level synchronization.

Often, a sub-packet ID (or at least a one-bit flag indicating an original transmission or a retransmission) is signaled along with each sub-packet to help mitigate this sequencing/synchronization error. Specifically, by looking at the accompanying sub-packet ID, the receiver will be able to detect the out-of-sequence transmission caused by an error on the acknowledgment channel. Unfortunately, such a signaling is rather expensive and is itself unreliable. Often, a disproportionate amount of bandwidth is required in order to transmit the sub-packet ID reliably.

Accordingly, there exists a need to detect an out of sequence transmission caused by the positive acknowledgment being mistaken as a negative acknowledgment without an explicit signaling.

SUMMARY

Embodiments described herein describe efficient methods and devices that can be used at the physical layer to detect an out of sequence transmission caused by a positive acknowledgement being mistaken as a negative acknowledgement without the use of explicit signaling of sub-packet identifications. The methods and apparatus described are both applicable to code combining and diversity combining techniques.

In one embodiment, a method and apparatus to determine whether a transmission was successfully received in a multiple access communication system is claimed. First and second encoded data packets are received and decoded. The first and second data packets are then re-encoded, and correlated to determine whether the first and second re-encoded data packets are the same. If there is a high degree of correlation, an indicator of acknowledgement is transmitted to indicate that there is a high degree of correlation between the first and second re-encoded data packets. If there is a low degree of correlation, a determination is made that the previously transmitted indicator of acknowledgement was correctly received.

In another embodiment, an apparatus to determine whether a previously transmitted indicator of acknowledgement was successfully received is described. A decoder is configured to receive and decode packets of data. An encoder is configured to re-encode the received data packets of decoded data. The channel interleaver is configured to separate the received data packets into channels. The sub-packet selector is configured to select sequential sub-packets. A correlator is configured to correlate the received packets of data with previously received packets of data to determine if the packets are substantially the same. If there is high degree of correlation, the receiver determines that the sub-packet in question belongs to the old transmission and issues another positive acknowledgement to indicate to the transmitter that the packet has been received correctly. If there is a low degree of correlation, then the receiver determines that the sub-packet in question belongs to the new transmission, which implicitly indicates to the receiver that the acknowledgement was correctly detected by the transmitter.

BRIEF DESCRIPTION OF THE DRAWINGS

Various aspects and features of the present invention are disclosed by the following detailed description and references to the accompanying drawings, in which.

DETAILED DESCRIPTION

Figure 1:
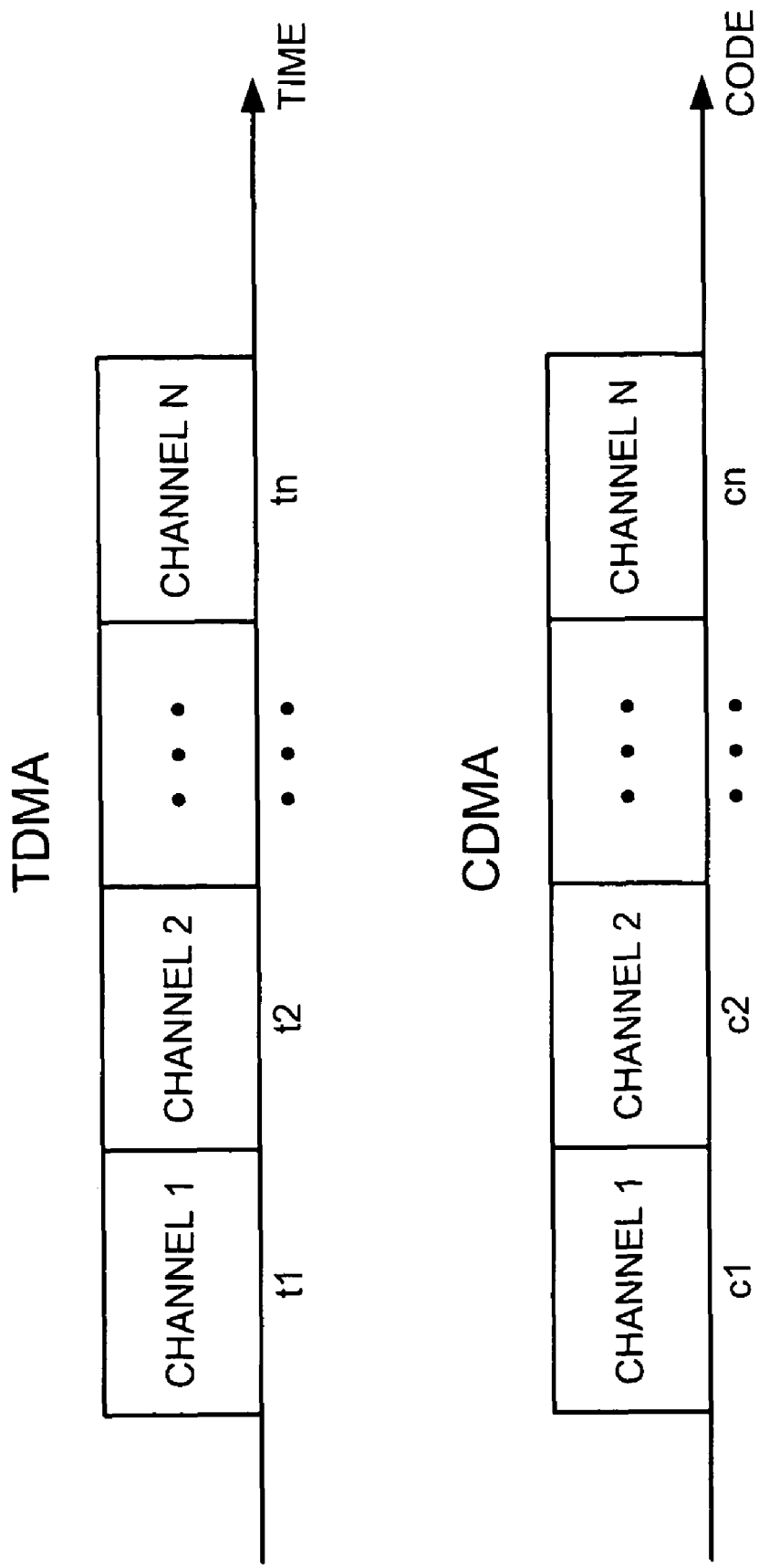
FIG. 1 is a diagram illustrating various channelization schemes in various multiple access systems.

In the following detailed description numerous specific details are set forth. However, it is understood that various embodiments of the invention may be practiced without these specific details. It should be appreciated and understood by one skilled in the art that the various embodiments of the invention described below are exemplary and are intended to be illustrative of the invention rather than limiting.

Embodiments of the invention describe an efficient method and apparatus that can be used at the physical layer to detect an out-of-sequence transmission caused by a positive acknowledgment being mistaken as a negative acknowledgment without an explicit signaling of a sub-packet ID. The techniques described are equally applicable for both code combining and diversity combining ARQ techniques.

When there is an ACK→NACK error, the receiver has already successfully decoded the packet and is expecting a transmission of the next packet. However, an ACK→NACK error causes the transmitter to retransmit the packet. The transmitter either sends the next sub-packet, when code combining techniques are used, or repeats the transmission, when diversity combining is used. Because there is no explicit signaling of an identifier of the packet, such as a sub-packet identifier, the receiver is not able to determine whether the newly arrived sub-packet is part of the old transmission (i.e., retransmission) or is a new transmission.

However, since the receiver has already successfully decoded the previously received packet, the receiver may be able to detect whether the received sub-packet is part of the old transmission or part of the new transmission. In one embodiment, this is accomplished through a correlation between the sub-packet in question with the re-encoded version of the decoded packet. The receiver needs to correctly choose which re-encoded sub-packet to perform correlation with. However, the receiver does have knowledge as to how many sub-packets have already been transmitted. Thus, if the correlation output is high (e.g., above a certain threshold), the receiver declares that the sub-packet in question belong to the old transmission. The receiver then issues another positive acknowledgment to indicate to the transmitter that the packet has been received correctly. However, if the correlation output is low, then the receiver declares the sub-packet belong to the new transmission, which implicitly indicates to the receiver that the acknowledgment is correctly detected by the transmitter.

The embodiments described herein are described in the context of using an incremental redundancy (IR) transmission scheme, such as the Automatic Repeat/Retransmission (ARQ) scheme or the Type II hybrid ARQ (H-ARQ) protocol. However, though H-ARQ systems are discussed for the purposes of explanation and illustration, it should be understood and appreciated by one skilled in the art that the teachings of the present invention are not limited to limited to multiple access system with ARQ transmission schemes, but are also equally applicable to other multiple systems which employ different numbers of interlaces for the purposes of providing redundancy.

The techniques described herein for using multiple modulation schemes for a single packet may be used for various communication systems such as an Orthogonal Frequency Division Multiple Access (OFDMA) system, a Code Division Multiple Access (CDMA) system, a Time Division Multiple Access (TDMA) system, a Frequency Division Multiple Access (FDMA) system, an orthogonal frequency division multiplexing (OFDM)-based system, a single-input single-output (SISO) system, a multiple-input multiple-output (MIMO) system, and so on. These techniques may be used for systems that utilize incremental redundancy and systems that do not utilize incremental redundancy (e.g., systems that simply repeats data).

Figure 2:
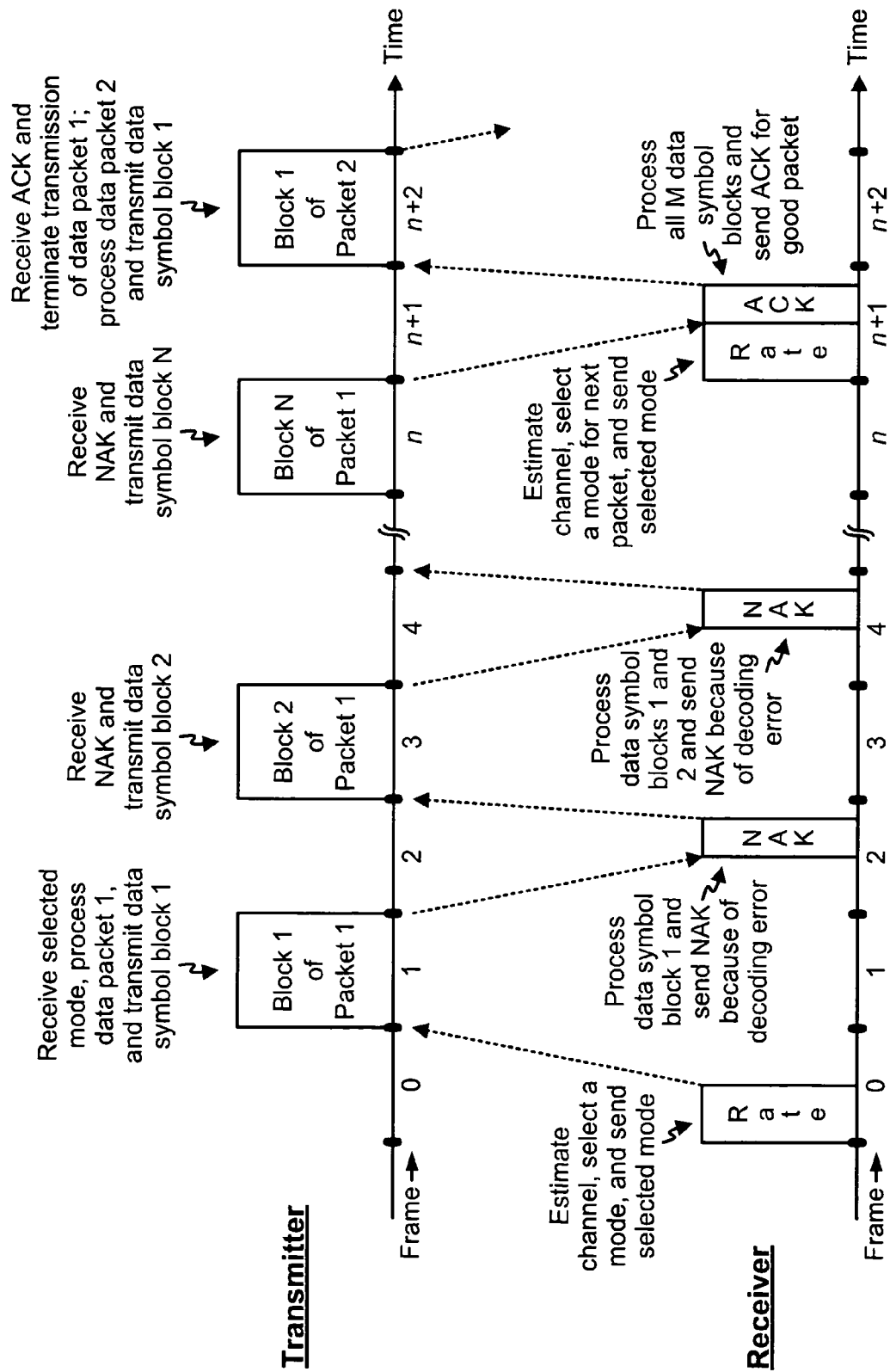
FIG. 2 illustrates an incremental redundancy transmission.

FIG. 2 illustrates an incremental redundancy transmission between a transmitter and a receiver in a communication system. The timeline for data transmission is partitioned into frames, with each frame having a particular time duration. For the incremental redundancy transmission embodiment shown in FIG. 2, the receiver initially estimates the communication channel, selects a "mode" based on the channel condition, and sends the selected mode to the transmitter in frame 0.

Alternatively, the receiver sends back an estimate of the channel quality, and the transmitter selects the mode based on the channel quality estimate. In any case, the mode may indicate the packet size, the code rate, the modulation scheme, and so on, for the packet. The transmitter processes a data packet (Packet 1) in accordance with the selected mode, and generates up to T blocks of data symbols for the packet. T is the maximum number of blocks for a given data packet and is greater than one (T>1) for incremental redundancy. The first block typically contains sufficient information to allow the receiver to decode the packet under good channel condition. Each subsequent block typically contains additional parity/redundancy information not contained in prior blocks. The transmitter then transmits the first data symbol block (Block 1) for Packet 1 in frame 1. The receiver receives, detects, and decodes the first data symbol block, determines that Packet 1 is decoded in error (i.e., "erased"), and sends back a negative acknowledgment (NACK) in frame 2. The transmitter receives the NACK and transmits the second data symbol block (Block 2) for Packet 1 in frame 3. The receiver receives and detects Block 2, decodes Blocks 1 and 2, determines that Packet 1 is still decoded in error, and sends back another NACK in frame 4. The block transmission and NACK response may repeat any number of times.

For the example shown in FIG. 2, the transmitter receives a NACK for data symbol block N−1 and transmits data symbol block N (Block N) for Packet 1 in frame n, where N≦T. The receiver receives and detects Block N, decodes Blocks 1 through N, determines that the packet is decoded correctly, and sends back an acknowledgment (ACK) in frame n+1. The receiver also estimates the communication channel, selects a mode for the next data packet, and sends the selected mode to the transmitter in frame n+1. The transmitter receives the ACK for Block N and terminates the transmission of Packet 1. The transmitter also processes the next data packet (Packet 2) in accordance with the selected mode, and transmits the first data symbol block (Block 1) for Packet 2 in frame n+2. The processing at the transmitter and receiver continues in the same manner for each data packet transmitted via the communication channel.

As shown in FIG. 2, with incremental redundancy, the transmitter sends each data packet in a series of block transmissions, with each block transmission carrying a portion of the packet. The receiver may attempt to decode the packet after each block transmission based on all blocks received for the packet. The transmitter terminates the transmission of the packet after successful decoding by the receiver.

For the example shown in FIG. 2, there is a delay of one frame for the ACK/NACK response from the receiver for each block transmission. In general, this delay may be one or multiple frames. To improve channel utilization, multiple data packets may be transmitted in an interlaced manner. For example, data packets for one traffic channel may be transmitted in odd-numbered frames and data packets for another traffic channel may be transmitted in even-numbered frames. More than two traffic channels may also be interlaced, e.g., if the ACK/NACK delay is longer than one frame.

The system may be designed to support a set of modes, which may also be called rates, packet formats, radio configurations, or some other terminology. Each mode may be associated with a particular code rate or coding scheme, a particular modulation scheme, a particular spectral efficiency, and a particular minimum signal-to-noise-and-interference ratio (SINR) required to achieve a target level of performance, e.g., 1% packet error rate (PER). Spectral efficiency refers to the data rate (or the information bit rate) normalized by the system bandwidth, and is given in units of bits per second per Hertz (bps/Hz). In general, higher SINRs are needed for higher spectral efficiencies. The set of supported modes covers a range of spectral efficiencies, typically in increments that are somewhat evenly spaced. For a given channel condition and received SINR, the mode with the highest spectral efficiency supported by that received SINR may be selected and used for data transmission.

Spectral efficiency is determined by the code rate and modulation scheme. The code rate is the ratio of the number of input bits into an encoder to the number of code bits generated by the encoder and transmitted. For example, a code rate of 2/9 (or R=2/9) generates nine code bits for every two input bits. A lower code rate (e.g., R=1/4 or 1/5) has more redundancy and thus greater error correction capability. However, more code bits are transmitted for a lower code rate, and spectral efficiency is thus also lower.

Various modulation schemes may be used for data transmission. Each modulation scheme is associated with a signal constellation that contains M signal points, where M>1. Each signal point is defined by a complex value and is identified by a B-bit binary value, where B≧1 and $2^B$=M. For symbol mapping, the code bits to be transmitted are first grouped into sets of B code bits. Each set of B code bits forms a B-bit binary value that is mapped to a specific signal point, which is then transmitted as a modulation symbol for that group of B code bits. Each modulation symbol thus carries information for B code bits. Some commonly used modulation schemes include Binary Phase Shift Keying (BPSK), Quadrature Phase Shift Keying (QPSK), M-ary Phase Shift Keying (M-PSK), and M-ary Quadrature Amplitude Modulation (M-QAM). The number of code bits per modulation symbol (B) can be given as: B=1 for BPSK, B=2 for QPSK, B=3 for 8-PSK, B=4 for 16-QAM, B=6 for 64-QAM, and so on. B is indicative of the order of a modulation scheme, and more code bits may be sent per modulation symbol for higher order modulation schemes.

Figure 3:
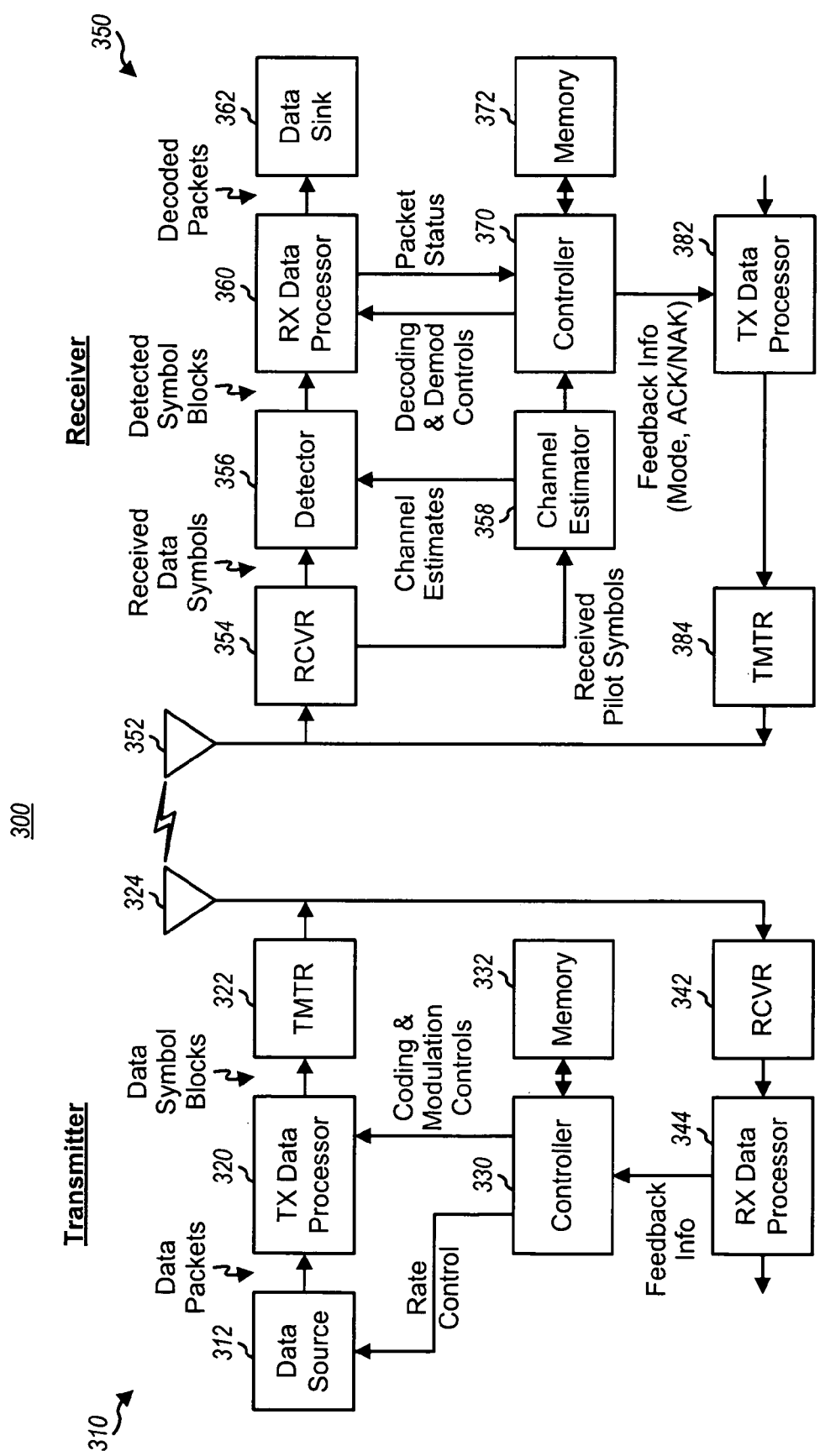
FIG. 3 illustrates a block diagram of a transmitter and receiver.

FIG. 3 illustrates a block diagram of a transmitter 310 and a receiver 350 in a wireless communication system 300 that utilizes IR transmission. At transmitter 310, a TX data processor 320 receives data packets from a data source 312. TX data processor 320 processes (e.g., formats, encodes, partitions, interleaves, and modulates) each data packet in accordance with a mode selected for that packet and generates up to T blocks of data symbols for the packet. The selected mode for each data packet may indicate (1) the packet size (i.e., the number of information bits for the packet) and (2) the particular combination of code rate and modulation scheme to use for each data symbol block of that packet. A controller 330 provides various controls to data source 312 and TX data processor 320 for each data packet based on the selected mode as well as the feedback (ACK/NACK) received for the packet, if desired. This process is discussed further with respect to FIG. 2. TX data processor 320 provides a stream of data symbol blocks (e.g., one block for each frame), where the blocks for each packet may be interlaced with the blocks for one or more other packets.

A transmitter unit (TMTR) 322 receives the stream of data symbol blocks from TX data processor 320 and generates a modulated signal. Transmitter unit 322 multiplexes in pilot symbols with the data symbols (e.g., using time, frequency, and/or code division multiplexing) and obtains a stream of transmit symbols. Each transmit symbol may be a data symbol, a pilot symbol, or a null symbol having a signal value of zero. Transmitter unit 322 may perform a form of OFDM modulation if OFDM is used by the system. For example, an OFDMA system employing OFDM schemes may be used. Transmitter unit 322 generates a stream of time-domain samples and further conditions (e.g., converts to analog, frequency upconverts, filters, and amplifies) the sample stream to generate the modulated signal. The modulated signal is then transmitted from an antenna 324 and via a communication channel to receiver 350.

At receiver 350, the transmitted signal is received by an antenna 352, and the received signal is provided to a receiver unit (RCVR) 354. Receiver unit 354 conditions, digitizes, and pre-processes (e.g., OFDM demodulates) the received signal to obtain received data symbols data symbols and received pilot symbols. Receiver unit 354 provides the received data symbols to a detector 356 and the received pilot symbols to a channel estimator 358. Channel estimator 358 processes the received pilot symbols and provides channel estimates (e.g., channel gain estimates and SINR estimates) for the communication channel. Detector 356 performs detection on the received data symbols with the channel estimates and provides detected data symbols to an RX data processor 360. The detected data symbols may be represented by log-likelihood ratios (LLRs) for the code bits used to form the data symbols (as described below) or by other representations. Whenever a new block of detected data symbols is obtained for a given data packet, RX data processor 360 processes (e.g., deinterleaves and decodes) all detected data symbols obtained for that packet and provides a decoded packet to a data sink 362. RX data processor 360 also checks the decoded packet and provides the packet status, which indicates whether the packet is decoded correctly or in error.

A controller 370 receives the channel estimates from channel estimator 358 and the packet status from RX data processor 360. Controller 370 selects a mode for the next data packet to be transmitted to receiver 350 based on the channel estimates. Controller 370 also assembles feedback information, which may include the selected mode for the next packet, an ACK or a NACK for the packet just decoded, and so on. The feedback information is processed by a TX data processor 382, further conditioned by a transmitter unit 384, and transmitted via antenna 352 to transmitter 310.

At transmitter 310, the transmitted signal from receiver 350 is received by antenna 324, conditioned by a receiver unit 342, and further processed by an RX data processor 344 to recover the feedback information sent by receiver 350. Controller 330 obtains the received feedback information, uses the ACK/NACK to control the IR transmission of the packet being sent to receiver 350, and uses the selected mode to process the next data packet to send to receiver 350.

Controllers 330 and 370 direct the operation at transmitter 310 and receiver 350, respectively. Memory units 332 and 372 provide storage for program codes and data used by controllers 330 and 370, respectively.

Figure 4:
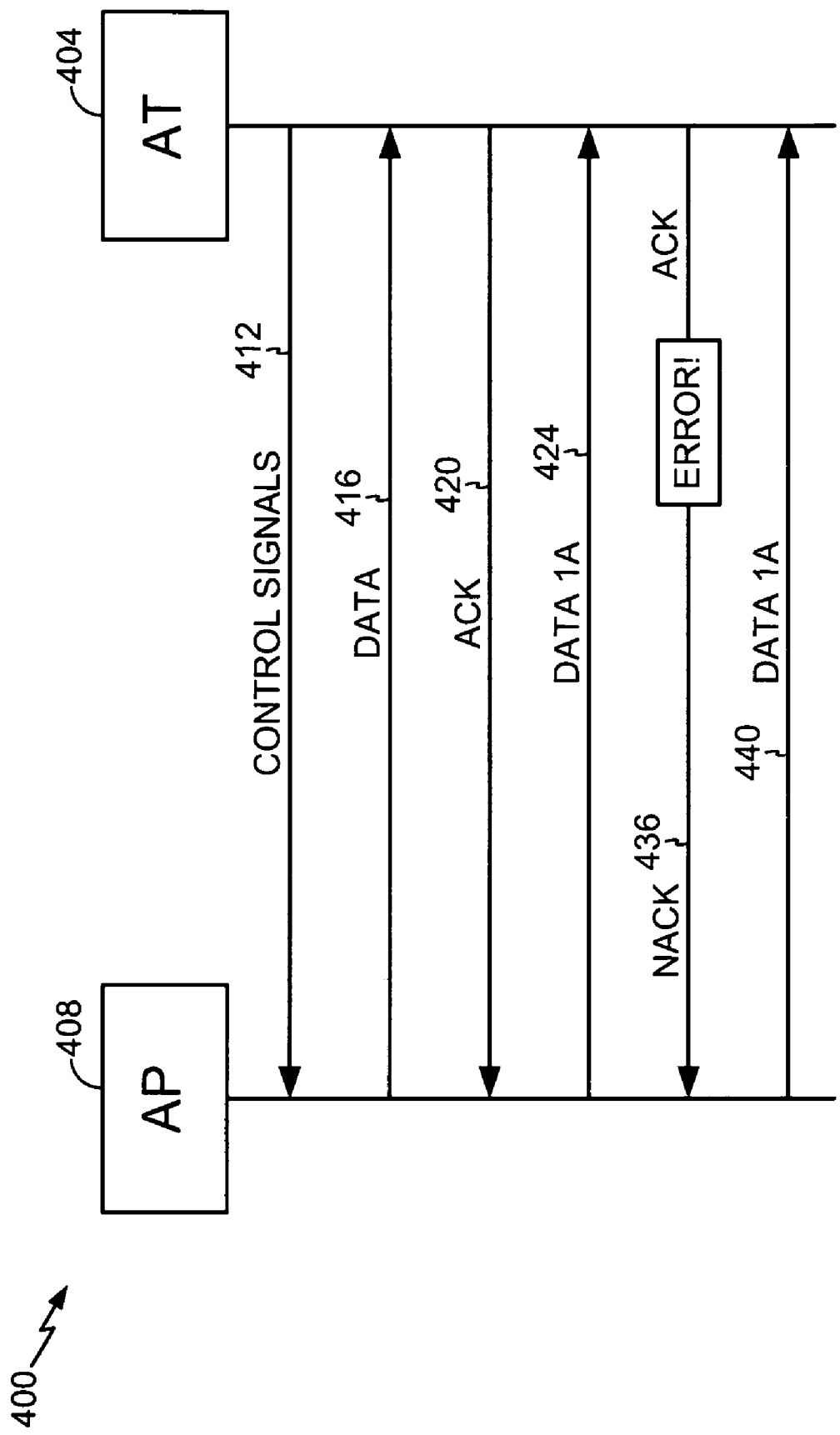
FIG. 4 illustrates a call process in which an ACK-to-NACK error occurs.

FIG. 4 illustrates a call process 400 in which a NACK-to-ACK error occurs. Specifically, FIG. 4 illustrates signals sent between access terminal 404 and access point 408. A call is established and various control signals are sent 412 from the access terminal 404 to the access point 408. These control signals include Channel Quality Information CQI, which is an indication of forward link channel quality, a REQUEST CHANNEL which indicates the initial request of a channel, and an ACK/NACK bit, which is an indication as to whether a transmission was properly received or not received.

Upon receipt of ACKs, data is transmitted 416 from the access point 408 to access terminal 404. In response to successful data transmissions, access terminal 404 responds with an ACK 420 to the access point 408. In response to receiving an ACK, the access point 408 then transmits the next data packet of interest 424 to the access terminal 404. If access terminal 404 properly decoded the data 1A transmitted, an ACK message 428 is sent. However, due to channel degradation, an error 442 may occur such that the ACK message 428 is actually interpreted to be an NACK message 436 as received by access point 408.

Access point 408, assuming the access terminal 404 did not properly decoded data packet 1A (as illustrated at point 436), retransmits data packet 1A (440) to access terminal 404. Access terminal 404, by virtue of sending ACK 428, is expecting a transmission of data 2A, but instead receives data 1A (440). This may potentially causes the access terminal 404 to become out of sync with access point 408. When the access terminal 404 and access point 408 become out of sync, then various recovery mechanisms are needed to get the access terminal 404 and access point 408 back into synchronization. This process is cumbersome and usually results in many data packers being lost. In any event, this situation is one to be avoided.

Figure 5:
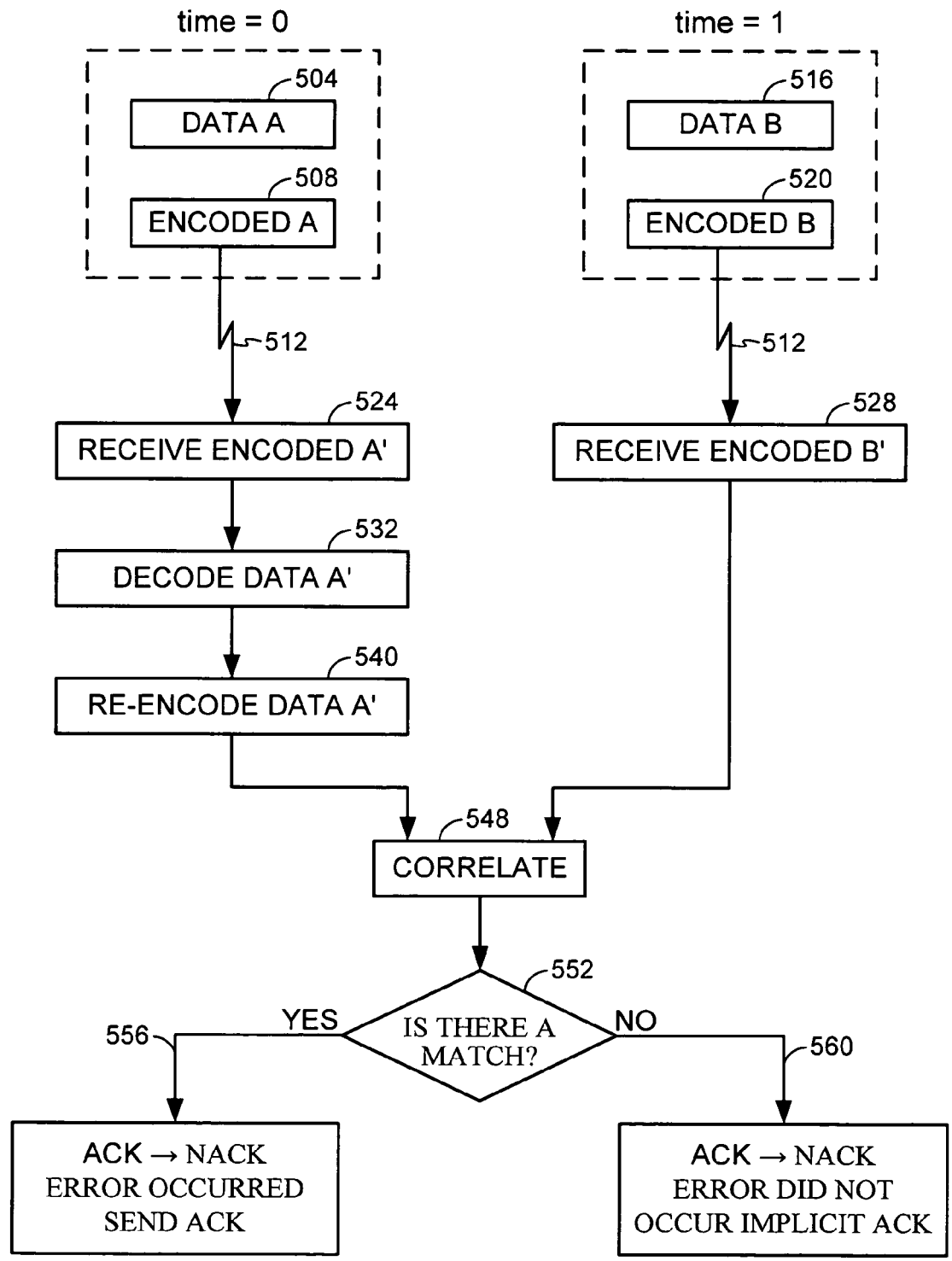
FIG. 5 illustrates a flow chart of an efficient method for detecting an ACK-to-NACK error.

FIG. 5 illustrates a flowchart of an efficient method for detecting an ACK-to-NACK error. A first data packet 504 is encoded by encoder 508 and transmitted across a transmission channel 512 in a first period of time, say time 0. Similarly, in time 1, data packet 516 is encoded 520 and similarly sent across transmission channel 512. A receiver is configured to receive the encoded data packet A' (524) at time 0 and the encoded data packet B' (528) at time 1. At step 524 and 528, the receiver is not readily able to determine that encoded packet A' is the same as encoded packet A, or that encoded packet B' is not the same as encoded packet B, because of noise and other artifacts introduced during transmission.

Data packet A' is then decoded 532 at time 0 and data packet B' is decoded 536 at time 1. The receiver then re-encodes 540 data packet A' in time 0 and re-encodes 544 data packet B' at time 1. The re-encoded data packet A' and the re-encoded data packet B', 540 and 544 respectively, are then correlated 548. A determination 552 is then made as to whether re-encoded data packet A' and re-encoded data packet B' are the same. If the data packets are substantially similar, a determination is made 556 that an ACK-to-NACK error has occurred and an indicator of acknowledgement (ACK) is sent. By re-encoded each packet, the receiver is able to determine if the correlation output is high, that the sub-packet in question belongs to the old transmission.

Conversely, if there is a low degree of correlation between re-encoded data packet A' (540) and re-encoded data packet B' (544), then a determination is made that an ACK-to-NACK did not occur 560. The receiver then determines that the sub-packet belongs to the new transmission, which implicitly indicates to the receiver that the acknowledgement was correctly detected by the transmitter.

Figure 6:
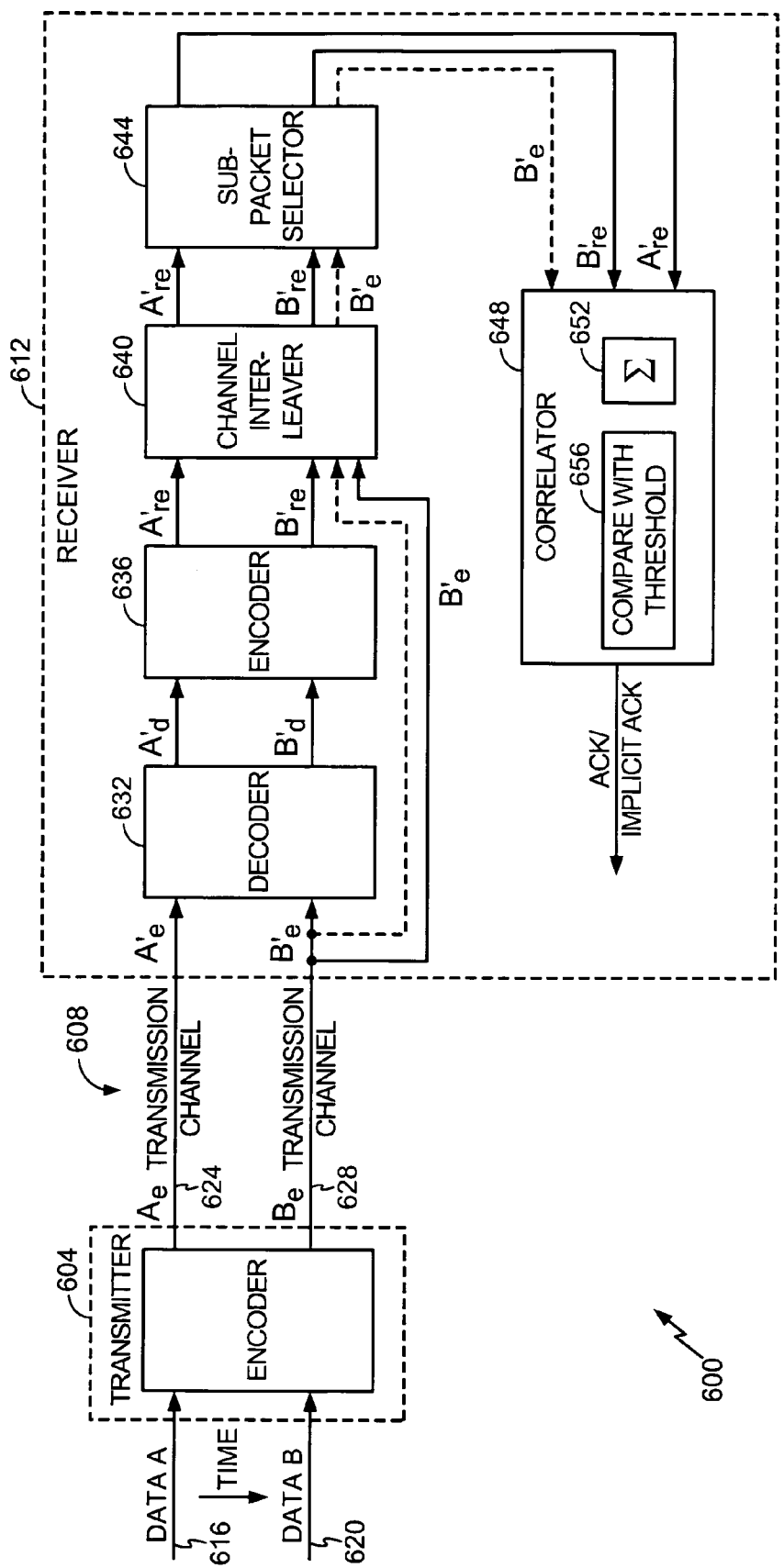
FIG. 6 illustrates a block diagram of an ACK-to-NACK error detector.

FIG. 6 illustrates a block diagram 600 of an ACK-to-NACK error detector. Data packets are input into transmitter 604, sent across transmission channel 608 and received by a receiver 612. This example describes the comparison between two data packets, data packet A (616) and data packet B (620). Data packet A is encoded thereby producing an encoded data packet $A_e$ 624. Similarly, data packet B is encoded producing data packet $B_e$ 628. The encoded data packets $A_e$ and $B_e$ are sent across transmission channel 608. Transmission channel 608 introduces noise and other artifacts into each of the sub-packets, such that receiver 612 receives the noise corrupted data packets.

Receiver 612 comprises a number of elements, including a decoder element 632, an encoder element 636, a channel interleaver 640, a sub-packet selector 644, and a correlator 648. The noise corrupted data packets, $A'_e$ and $B'_e$, are received by decoder 632 and decoded. Thus, decoder 632 outputs the decoded sub-packets ($A'_d$ and $B'_d$) which are then re-encoded by encoder 636. Encoder 636 re-encodes the data packets thereby producing $A'_{re}$ and $B'_{re}$ which are then input into channel interleaver 640. The channels are interleaved and the output is then input into sub-packet selector 644. The output of sub-packet selector 644, $A'_{re}$ and $B'_{re}$ are then input into correlator 648. Correlator 648 may comprise a summing element 652 and a comparator 656 which combines the two received data packets and compares them against the threshold. If the correlation output is high, meaning above a certain threshold, the receiver declares the sub-packet in question as belonging to the old transmission. If the correlation output is low, thereby being below a certain threshold, then the receiver declares the sub-packet transmission as belonging to the new transmission. The high correlation causes the receiver to transmit an ACK message back to the transmitter. A low correlation implicitly indicates to the receiver that the acknowledgement is correctly detected by the transmitter 604.

Figure 7:
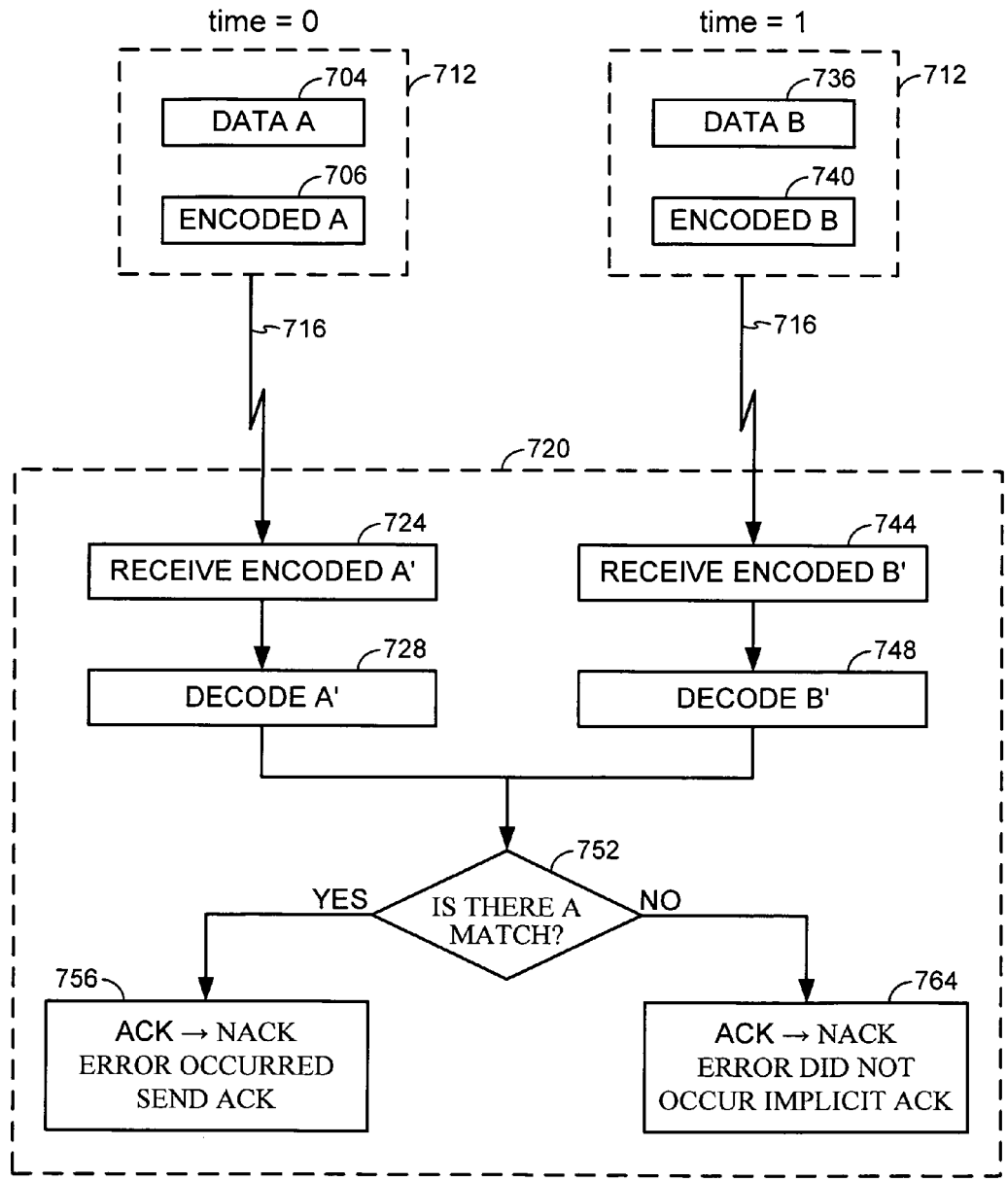
FIG. 7 illustrates a block diagram of an ACK-to-NACK error detection technique.

FIG. 7 illustrates a flow diagram of an ACK-to-NACK error detection technique according to an aspect. Block 712 illustrates a transmitter used to transmit data packets A 704 and data packet B 736. At block 706, data packet A is encoded and at block 740, data packet B is encoded. The encoded data packet A 706 and data packet B 740 are transmitted using communication link 716.

Block 720 illustrates a receiver that receives communication information over communication link 716. At block 724 and 744, the receiver receives a first and a second encoded data packet (for example A' and B'), respectively. At block 728, encoded data packet A' is decoded and data packet B' is decoded at block 748. At block 752, the decoded data packet A' and decoded data packet B' are compared to determine if data packets match. If there is a match, then at block 756, an ACK is sent indicating that an NACK error occurred. Otherwise, at block 764, it is determined that NACK error did not occur.

The steps of a method, process, or algorithm described in connection with the embodiments disclosed herein may be embodied directly in hardware, in a software module executed by a processor, or in a combination of the two.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium, which may also be referred to as a machine-readable medium, is coupled to the processor such the processor can read information from, and write information to, the storage medium. In the alternative, the storage medium may be integral to the processor. Further, the various methods may be performed in the order shown in the embodiments or may be performed using a modified order of steps. Additionally, one or more process or method steps may be omitted or one or more process or method steps may be added to the methods and processes. An additional step, block, or action may be added in the beginning, end, or intervening existing elements of the methods and processes The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method of determining whether a transmission was successfully received in a multiple access communication system, the method comprising:
   receiving, at a wireless device, a first and a second encoded data packet, wherein the first and second encoded data packets are received at different times from different transmissions;
   decoding the first and second encoded data packet;
   re-encoding the first and second data packets; and
   correlating the first and second re-encoded data packets to each other to determine whether the first and second re-encoded data packets are the same.

2. The method set forth in claim 1, further comprising transmitting, from the wireless device, an indicator of acknowledgement if there is a high correlation between the first and second re-encoded data packets.

3. The method set forth in claim 1, further comprising determining that a previously transmitted indicator of acknowledgement was correctly received if there is a low correlation between the first and second re-encoded data packets.

4. The method set forth in claim 1, further comprising determining that a previously transmitted indicator of acknowledgement was not correctly received if there is a high correlation between the first and second re-encoded data packets.

5. An apparatus to determine whether a transmission was successfully received in a multiple access communication system, the apparatus comprising:
   means for receiving a first and a second encoded data packet, wherein the first and second encoded data packets are received at different times from different transmissions;
   means for decoding the first and second encoded data packet;
   means for re-encoding the first and second data packets;
   means for correlating the first and second re-encoded data packets to each other to determine whether the first and second re-encoded data packets are the same.

6. The apparatus of claim 5, further comprising transmitting an indicator of acknowledgement if there is a high correlation between the first and second re-encoded data packets.

7. The apparatus of claim 5, further comprising determining that a previously transmitted indicator of acknowledgement was correctly received if there is a low correlation between the first and second re-encoded data packets.

8. The apparatus of claim 5, further comprising determining that a previously transmitted indicator of acknowledgement was not correctly received if there is a high correlation between the first and second re-encoded data packets.

9. An apparatus to determine whether a previously transmitted indicator of acknowledgment was successfully received, the apparatus comprising:
   a decoder configured to receive and decode packets of encoded data, wherein the first and second encoded data packets are received at different times from different transmissions;

an encoder configured to re-encode packets of decoded
data; and
a correlator configured to correlate the received packet of
data with a previously received packet of data to determine if the packets are the same.

10. A non-transitory machine-readable medium comprising instructions stored thereon, which, when executed by a processor, cause the processor to perform operations for determining whether a transmission was successfully received in a multiple access communication system, the machine-readable medium comprising:
 instructions to receive a first and a second encoded data packet, wherein the first and second encoded data packets are received at different times from different transmissions;
 instructions to decode the first and second encoded data packet;
 instructions to re-encode the first and second data packets; and
 instructions to correlate the first and second re-encoded data packets to each other to determine whether the first and second re-encoded data packets are the same.

11. The apparatus of claim 9, further comprising a transmitter configured to transmit an indicator of acknowledgement if there is a high correlation between the received packet and the previously received packet.

12. The apparatus of claim 9, wherein the correlator is further configured to determine that a previously transmitted indicator of acknowledgement was correctly received if there is a low correlation between the first and second re-encoded data packets.

13. The apparatus of claim 9, wherein the correlator is further configured to determine that a previously transmitted indicator of acknowledgement was not correctly received if there is a high correlation between the first and second re-encoded data packets.

14. The machine-readable medium of claim 10, further comprising:
 instructions to transmit an indicator of acknowledgement if there is a high correlation between the first and second re-encoded data packets.

15. The machine-readable medium of claim 10, further comprising:
 instructions to determine that a previously transmitted indicator of acknowledgement was correctly received if there is a low correlation between the first and second re-encoded data packets.

16. The machine-readable medium of claim 10, further comprising:
 instructions to determine that a previously transmitted indicator of acknowledgement was not correctly received if there is a high correlation between the first and second re-encoded data packets.

* * * * *